United States Patent
Yamada et al.

(10) Patent No.: US 8,194,358 B2
(45) Date of Patent: Jun. 5, 2012

(54) VOICE COIL MOTORS AND MAGNETIC CIRCUITS THEREFOR

(75) Inventors: Hiroyuki Yamada, Echizen (JP); Daiki Kato, Echizen (JP); Keiji Nagamiya, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1025 days.

(21) Appl. No.: 12/051,700

(22) Filed: Mar. 19, 2008

(65) Prior Publication Data

US 2008/0231997 A1    Sep. 25, 2008

(30) Foreign Application Priority Data

Mar. 20, 2007    (JP) .................................. 2007-072789

(51) Int. Cl.
G11B 5/55 (2006.01)
G11B 21/08 (2006.01)
G11B 5/56 (2006.01)
G11B 21/24 (2006.01)

(52) U.S. Cl. .................. 360/264.9; 360/294.5
(58) Field of Classification Search ............... 360/294.5, 360/264.7–264.9, 266.4–266.8
See application file for complete search history.

(56) References Cited

U.S. PATENT DOCUMENTS

| | | | |
|---|---|---|---|
| 4,396,966 A * | 8/1983 | Scranton et al. | 360/267.9 |
| 4,415,941 A * | 11/1983 | Gibeau et al. | 360/266.5 |
| 4,439,699 A * | 3/1984 | Brende et al. | 310/13 |
| 4,506,307 A * | 3/1985 | Watrous | 360/266.5 |
| D281,321 S | 11/1985 | Wright | |
| 4,652,779 A * | 3/1987 | Wilcox | 310/13 |
| 4,985,652 A | 1/1991 | Oudet et al. | |
| 5,119,253 A | 6/1992 | Kotani | |
| 5,122,702 A * | 6/1992 | Nakazato | 310/13 |
| 5,315,466 A | 5/1994 | Nishimoto et al. | |
| 5,581,422 A | 12/1996 | Umehara | |
| 5,585,981 A | 12/1996 | Lee | |
| 5,621,591 A | 4/1997 | Rahimi et al. | |
| 5,675,455 A | 10/1997 | Matsumoto | |
| 5,691,581 A | 11/1997 | Umehara et al. | |
| 5,822,156 A | 10/1998 | Suzuki et al. | |
| 5,864,447 A | 1/1999 | Matsumoto et al. | |
| 5,872,688 A | 2/1999 | Battu et al. | |
| 5,875,076 A | 2/1999 | Hachiya et al. | |

(Continued)

FOREIGN PATENT DOCUMENTS

JP    57-103171 A    6/1982

(Continued)

OTHER PUBLICATIONS

Charles M. Kozierok, "Air Circulation and Air Filtration" article from the PC Guide, www.pcguide.com, Copyright 1997-2004, Downloaded Mar. 5, 2009.

(Continued)

Primary Examiner — Daniell L Negron
Assistant Examiner — Adam B Dravininkas
(74) Attorney, Agent, or Firm — Birch, Stewart, Kolasch & Birch, LLP (57) ABSTRACT

A magnet of rectangular prism or parallelepiped prism shape is disposed on a yoke having a triangle shape or a frusto-triangular shape to construct a magnetic circuit for a voice coil motor. The magnetic circuits facilitate positioning and holding of a moving coil, and the voice coil motor is improved in positioning precision of a magnetic head.

5 Claims, 10 Drawing Sheets

U.S. PATENT DOCUMENTS

| | | | |
|---|---|---|---|
| 5,956,213 | A | 9/1999 | Dague et al. |
| 5,999,372 | A | 12/1999 | Peterson et al. |
| 5,999,374 | A | 12/1999 | Kim |
| 6,043,957 | A * | 3/2000 | Hattori et al. ............... 360/294.3 |
| 6,115,215 | A | 9/2000 | Adams et al. |
| 6,125,016 | A * | 9/2000 | Lin ............................ 360/264.8 |
| 6,175,469 | B1 | 1/2001 | Ahmad et al. |
| 6,252,744 | B1 | 6/2001 | Kelemen |
| 6,285,530 | B1 * | 9/2001 | Nakai ........................ 360/266.6 |
| 6,342,987 | B1 | 1/2002 | Hattori et al. |
| 6,445,548 | B1 | 9/2002 | Sasaki et al. |
| 6,606,223 | B2 | 8/2003 | Ooi et al. |
| 6,608,732 | B2 | 8/2003 | Bernett et al. |
| 6,787,941 | B2 | 9/2004 | Takashima |
| 6,821,359 | B2 | 11/2004 | Osugi et al. |
| 6,865,061 | B2 | 3/2005 | Miyamoto et al. |
| 6,914,755 | B2 | 7/2005 | Yanagihara |
| 7,414,815 | B2 | 8/2008 | Fujimoto et al. |
| 2001/0048576 | A1 * | 12/2001 | Kazmierczak ............. 360/264.7 |
| 2002/0039260 | A1 | 4/2002 | Kilmer |
| 2002/0191346 | A1 | 12/2002 | Oki et al. |
| 2007/0025024 | A1 | 2/2007 | Iwahara |
| 2008/0231996 | A1 | 9/2008 | Yamada et al. |
| 2008/0231997 | A1 | 9/2008 | Yamada et al. |
| 2009/0015968 | A1 | 1/2009 | Xu et al. |

FOREIGN PATENT DOCUMENTS

| | | | |
|---|---|---|---|
| JP | 2-103783 U | | 4/1990 |
| JP | 04023414 A | * | 1/1992 |
| JP | 6-178523 A | | 6/1994 |
| JP | 7-170712 A | | 7/1995 |
| JP | 07170712 A | * | 7/1995 |
| JP | 2004-23969 A | | 1/2004 |

OTHER PUBLICATIONS

Charles M. Kozierok, "Floating Height/Flying Height/Head Gap" article from the PC Guide, www.pcguide.com, Copyright 1997-2004, Downloaded Mar. 5, 2009.

Charles M. Kozierok, "Hard Disk Head Sliders, Arms and Actuator" article from the PC Guide, www.pcguide.com, Copyright 1997-2004, Downloaded Mar. 5, 2009.

Charles M. Kozierok, "Head Actuator" article from the PC Guide, www.pcguide.com, Copyright 1997-2004, Downloaded Mar. 5, 2009.

Charles M. Kozierok, "Head Crashes" article from the PC Guide, www.pcguide.com, Copyright 1997-2004, Downloaded Mar. 5, 2009.

Extended European Search Report dated Aug. 5, 2009 for corresponding European Application No. 08250970.4.

Foreign Office Action dated Jun. 1, 2011 for Japanese Application No. 2008-065234.

English-Language Abstract of JP-2004-023969-A, published Jan. 22, 2004.

* cited by examiner

VOICE COIL MOTORS AND MAGNETIC CIRCUITS THEREFOR

CROSS-REFERENCE TO RELATED APPLICATION

This non-provisional application claims priority under 35 U.S.C. §119(a) on Patent Application No. 2007-072789 filed in Japan on Mar. 20, 2007, respectively, the entire contents of which are hereby incorporated by reference.

TECHNICAL FIELD

This invention relates to voice coil motors for head positioning in magnetic disk units, and magnetic circuits for use therein.

BACKGROUND OF THE INVENTION

In general, a hard disk unit includes a medium having a magnetic recording film deposited thereon, a spindle motor for rotating the medium at a predetermined rotational speed, a magnetic head for writing and reading information data, a voice coil motor (VCM) for driving the magnetic head, a controller and the like. The recent drastic price competition among manufacturers imposes a demand for further cost reduction on voice coil motors as well.

Figure 1:
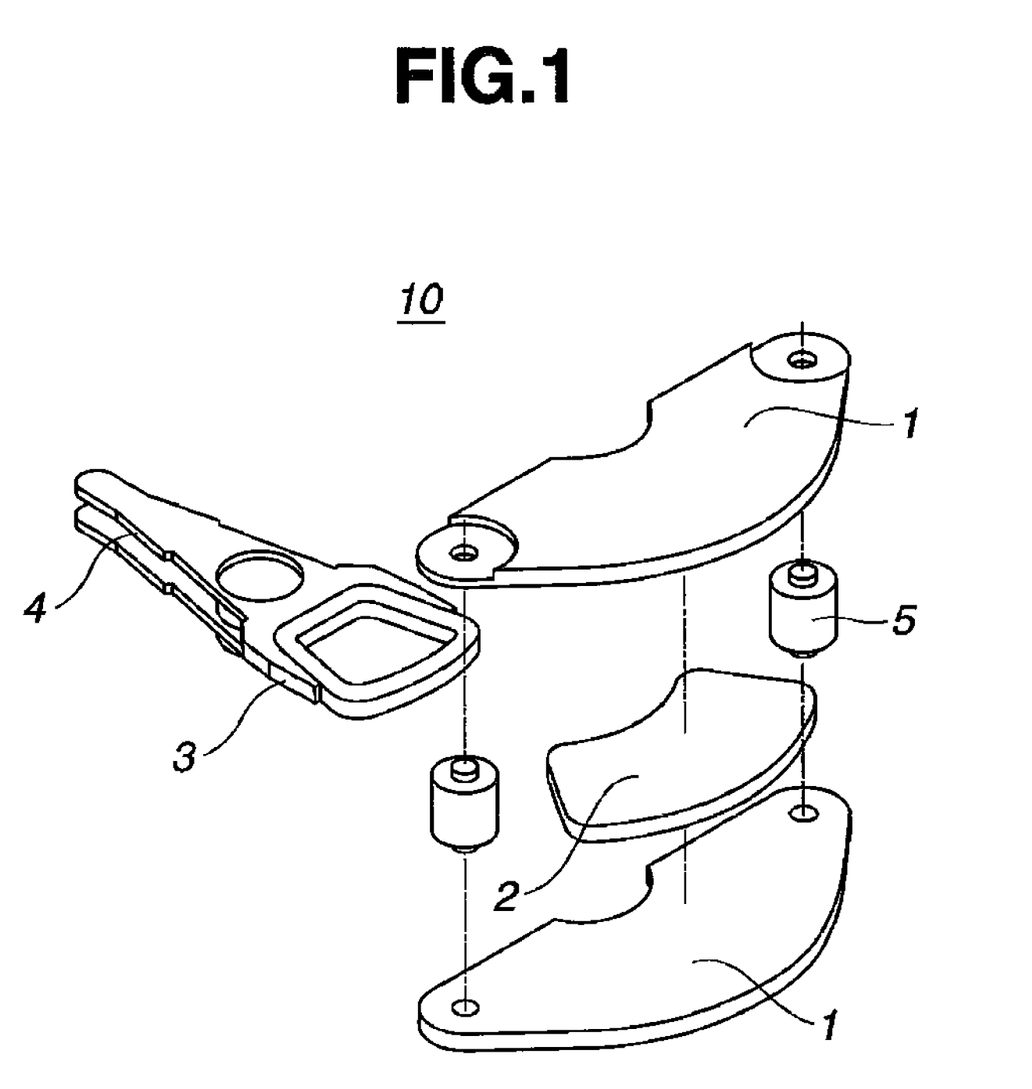
FIG. 1 is an exploded perspective view of a voice coil motor (VCM).

Referring to FIG. 1, a voice coil motor 10 includes magnetic material yokes 1, 1 and magnets (permanent magnets) 2 adhesively disposed thereon as described in JP-A 2004-23969. It is noted that the magnet adhesively disposed on the upper yoke 1 is omitted in FIG. 1 for simplicity of illustration. The yokes 1, 1 are opposed and coupled by magnetic material posts 5 such that magnets 2 face each other to define a space therebetween. A moving coil 3 on an arm 4 is located in the space between magnets 2. The voice coil motor 10 has a function of positioning a magnetic head. After magnets 2 are disposed on yokes 1, they are magnetized so as to produce alternate magnetic poles in the order of N and S.

Figure 2:
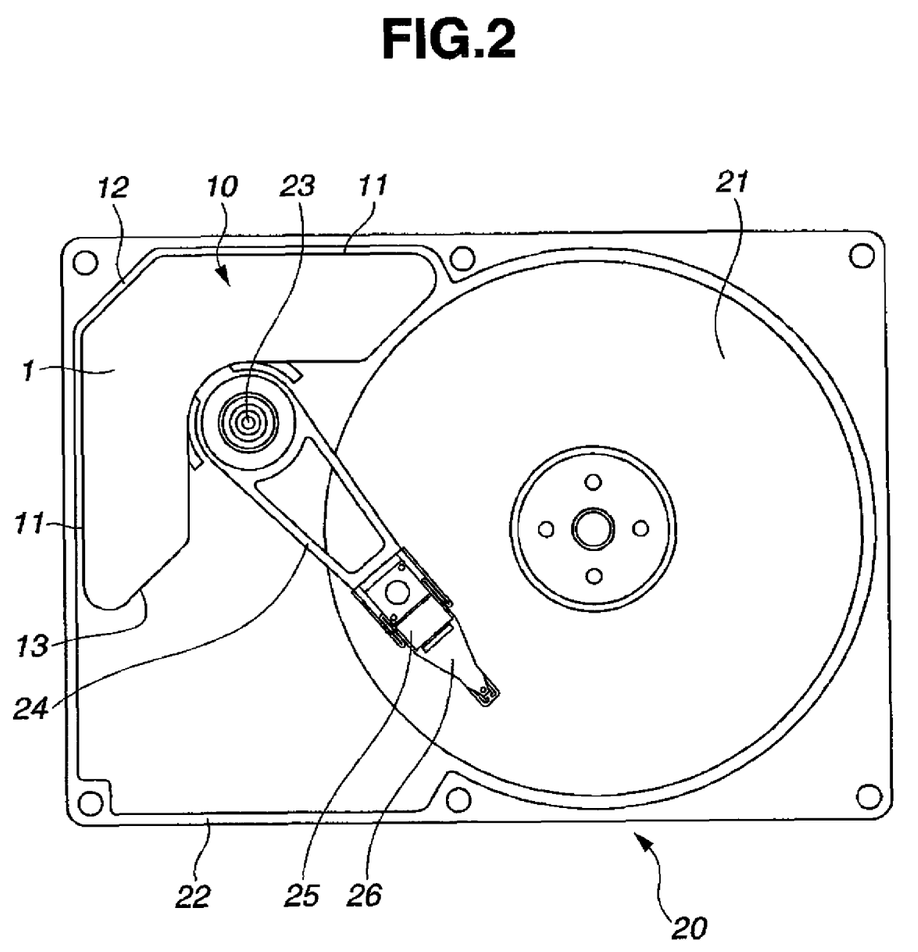
FIG. 2 is a plan view of a magnetic disk unit.
Figure 3:
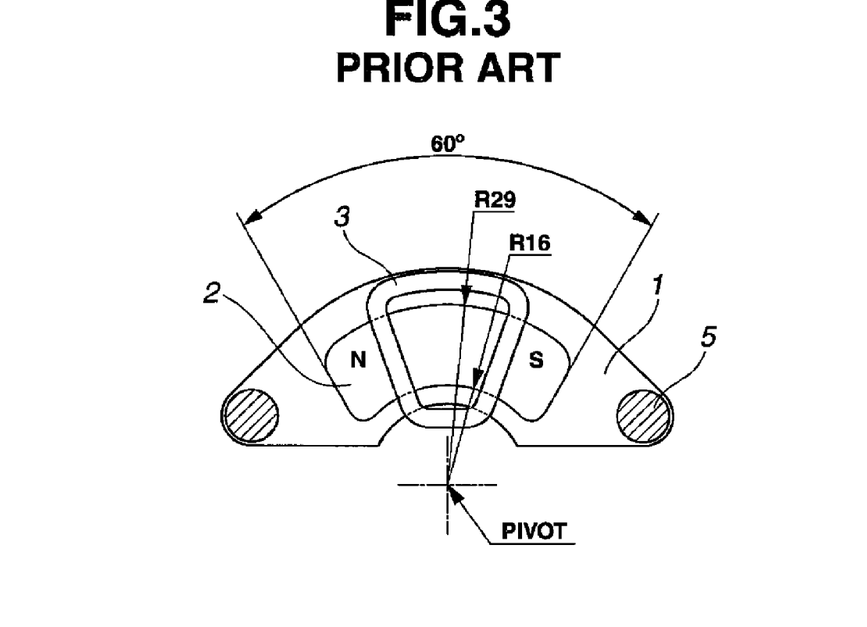
FIG. 3 is a schematic plan view of a prior art VCM.

The shape of magnets is generally determined depending on the required performance of a voice coil motor. Referring to FIG. 2, a magnetic disk unit 20 is illustrated which includes a generally rectangular housing 22 for receiving a magnetic disk 21. The disk unit 20 further includes a pivot 23, an arm 24, a magnetic head actuator 25, and a suspension 26. The voice coil motor 10 is typically disposed at one corner of housing 22. To comply with this geometry, the yoke 1 is configured to (1) a triangular shape, typically right-angled triangular shape, including side portions 11, 11 opposed to the adjacent walls defining the one corner of the rectangular housing 22, an apex 12 defined by side portions 11, 11, and a bottom 13 opposed to apex 12, (2) a frusto-triangular shape in which the apex of a triangle is truncated or rounded, or (3) an arcuate, crescent or semicircular ring shape in which the bottom of a triangle at its center is recessed or cut-off in a semi-circular, triangular or apex-rounded triangular form. The magnet is also configured in conformity to the yoke 1, specifically to an arcuate, truncated arcuate or truncated inverse-V shape as illustrated in FIG. 3.

To form a magnet of an arcuate or similar shape, a mold of a corresponding shape must be prepared and worked such as by shaping, cutting, grinding or otherwise machining, which operation is expensive and less productive. In the event a magnet of an arcuate or similar shape is used, it is difficult to secure the magnet to the yoke at the registered position. A problem arises particularly in a compact magnetic disk unit because the accuracy of magnet registration has a substantial influence on the torque.

DISCLOSURE OF THE INVENTION

An object of the invention is to provide a magnetic circuit for a voice coil motor having the advantages of more accurate positioning of a magnetic head, minimized torque variation, and highly effective magnet production; and a voice coil motor.

It has been found that when the magnet used in a voice coil motor is formed to a rectangular prism or parallelepiped prism shape, there are achieved advantages of minimized torque variation and more accurate positioning of a magnetic head. The invention is predicated on this finding.

The invention provides a magnetic circuit and a voice coil motor as defined below.

[1] A magnetic circuit for a voice coil motor, comprising a magnetic material yoke and a magnet of rectangular prism or parallelepiped prism shape disposed thereon.

[2] A magnetic circuit for a voice coil motor, comprising a magnetic material yoke and two magnet pieces of rectangular prism or parallelepiped prism shape which are serially arranged thereon so that the magnet pieces produce alternate magnetic poles while their end faces are in abutment or spaced apart.

[3] A magnetic circuit for a voice coil motor, comprising a pair of opposed magnetic material yokes, and a magnet disposed on at least one of the pair of yokes so that the magnet faces the other yoke, said magnet being a single magnet piece of rectangular prism or parallelepiped prism shape.

[4] The magnetic circuit of [3], wherein the magnet is disposed on each of the pair of yokes so that the magnets face each other, each said magnet being a single magnet piece of rectangular prism or parallelepiped prism shape.

[5] A magnetic circuit for a voice coil motor, comprising a pair of opposed magnetic material yokes, and a magnet disposed on at least one of the pair of yokes so that the magnet faces the other yoke, wherein said magnet consists of two magnet pieces of rectangular prism or parallelepiped prism shape, which are serially arranged on the yoke so that the magnet pieces produce alternate magnetic poles while their end faces are in abutment or spaced apart.

[6] The magnetic circuit of [5], wherein the magnet is disposed on each of the pair of yokes so that the magnets face each other, and each said magnet consists of two magnet pieces of rectangular prism or parallelepiped prism shape, which are serially arranged on the yoke so that the magnet pieces produce alternate magnetic poles while their end faces are in abutment or spaced apart.

[7] A voice coil motor comprising a pair of opposed magnetic material yokes, a magnet disposed on at least one of the pair of yokes so that the magnet faces the other yoke, and a moving coil located between the magnet and the other yoke, wherein said magnet is a single magnet piece of rectangular prism or parallelepiped prism shape.

[8] The voice coil motor of [7], wherein the magnet is disposed on each of the pair of yokes so that the magnets face each other, and each said magnet is a single magnet piece of rectangular prism or parallelepiped prism shape. The moving coil is inserted into a space between the magnets each of which is disposed on each of the pair of yokes.

[9] A voice coil motor comprising a pair of opposed magnetic material yokes, a magnet disposed on at least one of the pair of yokes so that the magnet faces the other yoke, and a moving coil located between the magnet and the other yoke, wherein said magnet consists of two magnet pieces of rectangular prism or parallelepiped prism shape, which are serially arranged on the yoke so that the magnet pieces produce alternate magnetic poles while their end faces are in abutment or spaced apart.

[10] The voice coil motor of [9], wherein the magnet is disposed on each of the pair of yokes so that the magnets face each other, and each said magnet consists of two magnet pieces of rectangular prism or parallelepiped prism shape, which are serially arranged on the yoke so that the magnet pieces produce alternate magnetic poles while their end faces are in abutment or spaced apart. The moving coil is inserted into a space between the magnets each of which is disposed on each of the pair of yokes.

BENEFITS OF THE INVENTION

Combination of a magnet of rectangular prism or parallelepiped prism shape with a yoke and a coil of proper shape provides a magnetic circuit which facilitates positioning and holding of the coil. The voice coil motor is more accurate in positioning the magnetic head.

BRIEF DESCRIPTION OF THE DRAWINGS

FIG. 4 schematically illustrates a VCM according to one embodiment of the invention, FIG. 4A being a plan view (taken along lines I-I in FIG. 4B) and FIG. 4B being an elevational view.

FIG. 5 schematically illustrates a VCM according to another embodiment of the invention, FIG. 5A being a plan view (taken along lines II-II in FIG. 5B) and FIG. 5B being an elevational view.

FIG. 6 schematically illustrates a VCM according to a further embodiment of the invention, FIG. 6A being a plan view (taken along lines III-III in FIG. 6B) and FIG. 6B being an elevational view.

FIG. 7 schematically illustrates a VCM according to a still further embodiment of the invention, FIG. 7A being a plan view (taken along lines IV-IV in FIG. 7B) and FIG. 7B being an elevational view.

FIG. 8 schematically illustrates a VCM according to a yet further embodiment of the invention, FIG. 8A being a plan view (taken along lines V-V in FIG. 8B) and FIG. 8B being an elevational view.

FIG. 9 schematically illustrates a VCM according to a still further embodiment of the invention, FIG. 9A being a plan view (taken along lines VI-VI in FIG. 9B) and FIG. 9B being an elevational view.

DESCRIPTION OF THE PREFERRED EMBODIMENT

In the following description, like reference characters designate like or corresponding parts throughout the several views. It is also understood that terms such as "top," "bottom," "lateral" and the like are words of convenience and used as seen looking at a figure and are not to be construed as limiting terms.

Figure 4A:
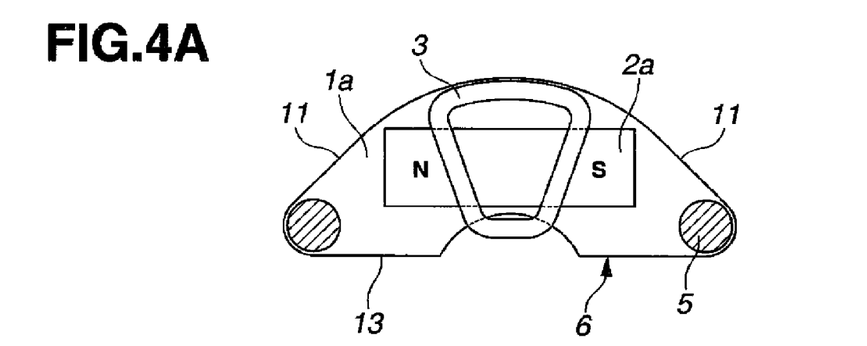
Figure 4B:
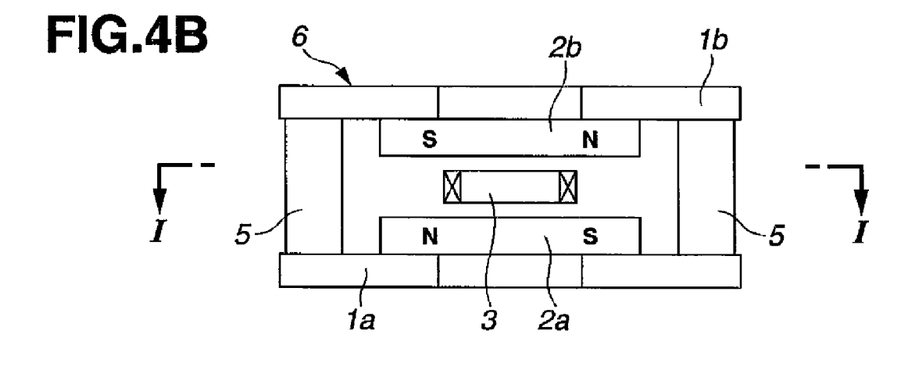

Referring to FIG. 4, a voice coil motor (VCM) according to one embodiment of the invention is illustrated. The magnetic circuit of the invention is composed essentially of magnetic material yokes and magnets. As shown in FIGS. 4A and 4B, the VCM includes a pair of yokes 1a, 1b having magnets 2a, 2b adhesively attached thereto. The yokes 1a, 1b are coupled and spaced apart by posts 5, 5 of magnetic material such that magnets 2a, 2b face each other. A moving coil 3 is inserted into the space between magnets 2a, 2b to construct the VCM.

The VCM is characterized in that one magnet of rectangular prism or parallelepiped prism shape is disposed on each yoke; or two magnet pieces of rectangular prism or parallelepiped prism shape are serially arranged on each yoke so that the magnet pieces produce alternate magnetic poles.

The yoke has a shape that fits in the magnetic disk unit and is disposed at one corner of a rectangular shaped housing for receiving a magnetic disk. The yoke is generally configured to a triangular shape, a frusto-triangular shape in which the apex of a triangle is truncated or rounded, or an arcuate, crescent or semi-circular ring shape in which the bottom of a triangle at its center is recessed or cut-off in a semi-circular, triangular or apex-rounded triangular form. The yoke is made of a magnetic material such as silicon steel or carbon steel and usually provided at lateral ends with holes through which posts or bolts are fitted to couple magnetic circuits together.

A magnet is registered and adhesively attached onto the yoke. According to the invention, the magnet has a rectangular prism or parallelepiped prism shape, which facilitates registration of the magnet relative to the yoke. By contrast, when a magnet has an arcuate or curved shape commonly employed in the prior art, registration of the magnet relative to the yoke is less easy, and any misregistration leads to a problem of torque variations.

Figure 5A:
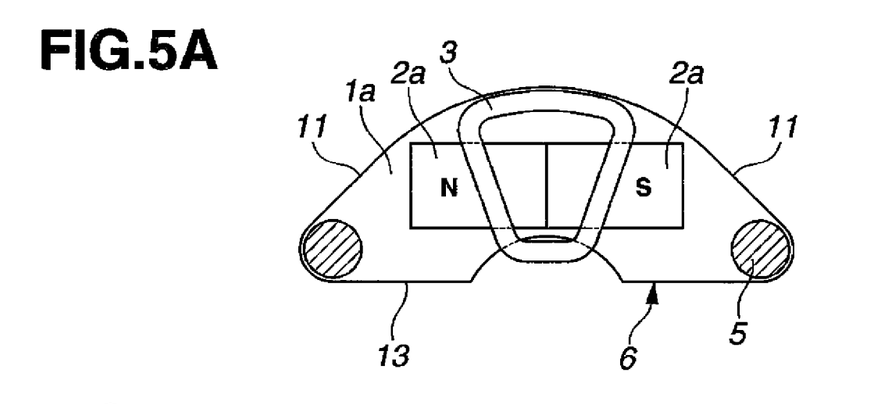
Figure 5B:
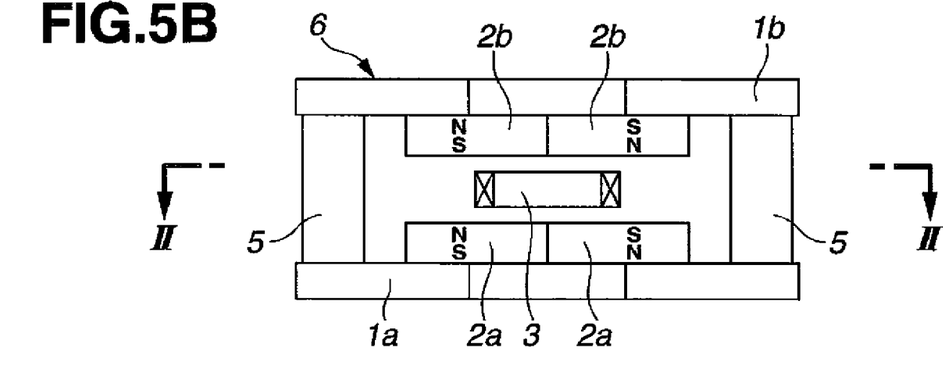
Figure 6A:
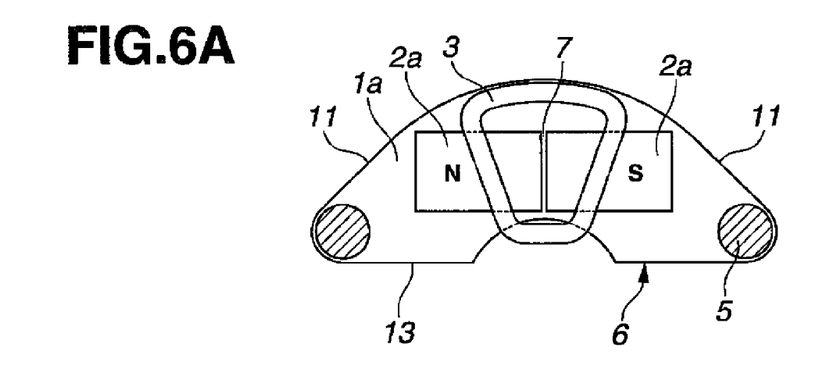
Figure 6B:
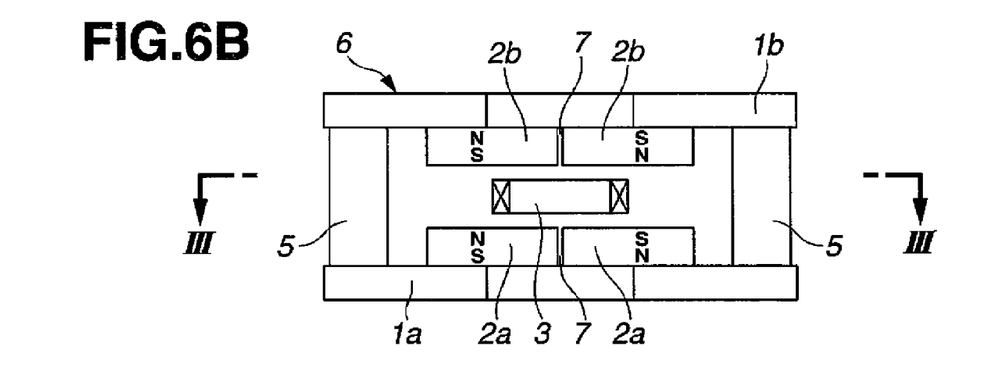

The disposition of a magnet on a yoke is described. When one magnet piece is used per yoke, as shown in FIG. 4A, magnet piece 2 is preferably disposed on yoke 1 such that the longitudinal direction of magnet piece 2 is parallel or substantially parallel to a bottom 13 of yoke 1 (i.e., a straight line connecting the lower ends of two oblique sides 11, 11). When two magnet pieces are used per yoke, as shown in FIGS. 5A and 6A, two magnet pieces 2a, 2a (or 2b, 2b) are preferably arranged in series such that the longitudinal direction of magnet pieces 2 is parallel to bottom 13 of yoke 1. It is understood that a magnet piece of rectangular or parallelepiped prism shape has a pair of major surfaces, a pair of end faces, and a pair of side faces. FIGS. 5A and 5B illustrates one embodiment wherein two magnet pieces are arranged side by side with their end faces in abutment. FIGS. 6A and 6B illustrates another embodiment wherein two magnet pieces are arranged so as to leave a gap 7 between their end faces. Except for the arrangement of magnet pieces, the construction of these embodiments is the same as in the magnetic circuit and VCM of FIGS. 4A and 4B.

Figure 7A:
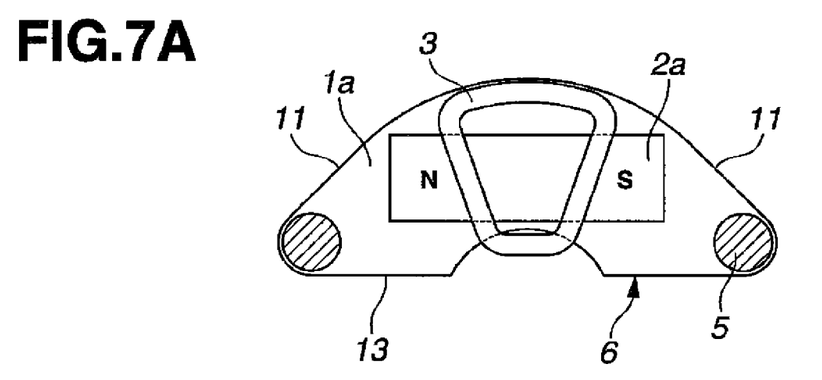
Figure 7B:
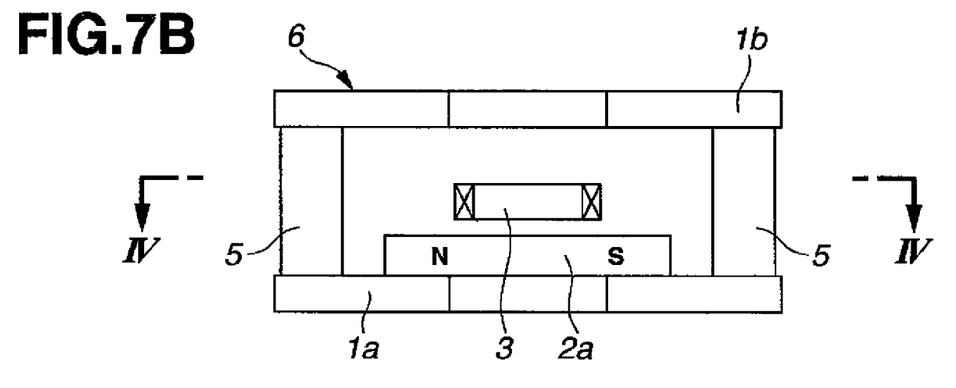
Figure 8A:
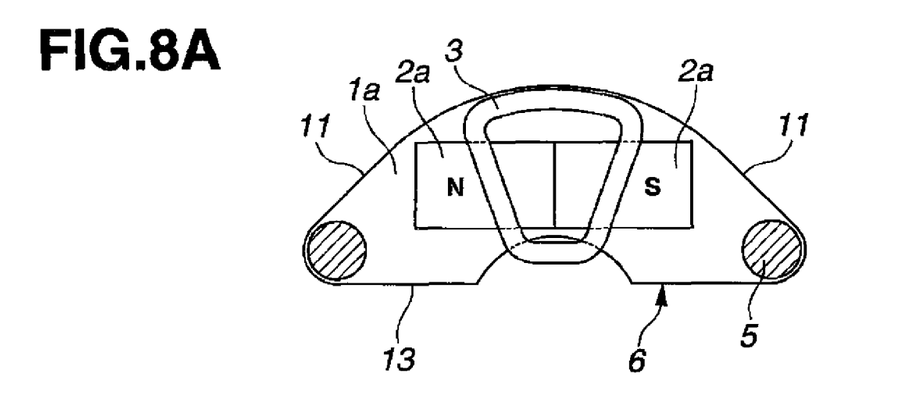
Figure 8B:
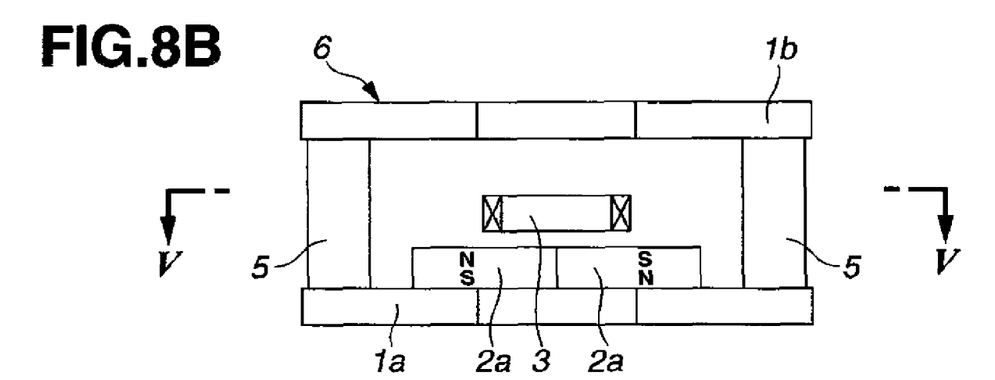
Figure 9A:
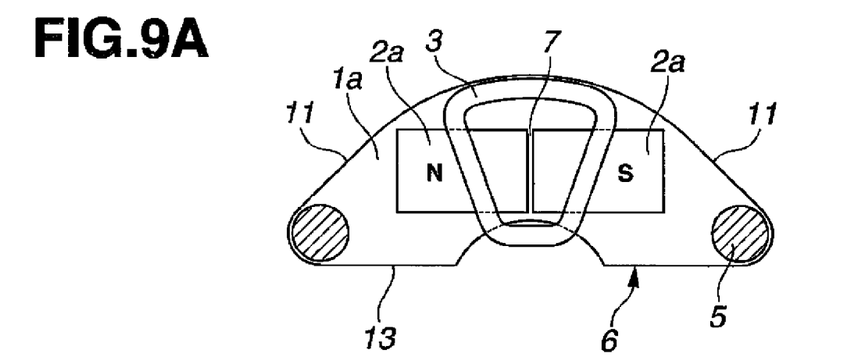
Figure 9B:
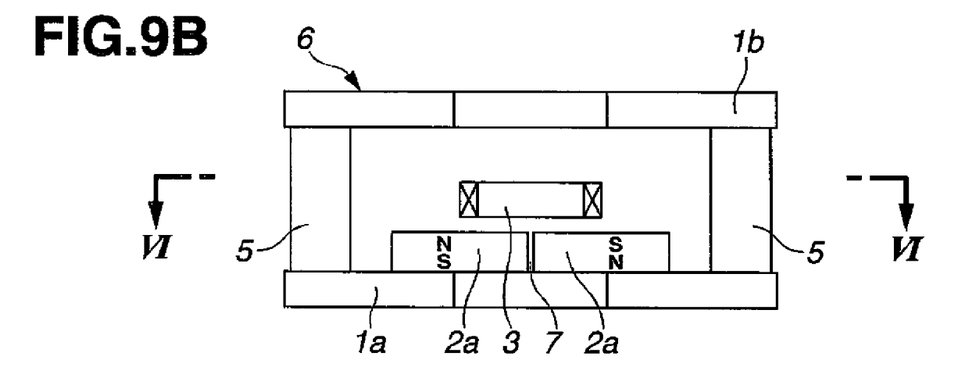

Although magnets 2a, 2b are disposed on yokes 1a, 1b, respectively, in the magnetic circuit and VCM of FIGS. 4 to 6, it is also acceptable that as shown in FIGS. 7 to 9, one magnet 2a (consisting of a single piece or two abutted or spaced pieces) is disposed on only one yoke 1a, no magnet is disposed on the other yoke 1b, and the other yoke 1b faces the magnet 2a. In the latter case, the moving coil 3 is inserted between magnet 2a and the other yoke 1b. Specifically, FIG. 7 illustrates one embodiment wherein a monolithic magnet 2a is disposed on only one yoke 1a; FIG. 8 illustrates another embodiment wherein two magnet pieces 2a, 2a in abutment are serially arranged on only one yoke 1a; FIG. 9 illustrates a further embodiment wherein two magnet pieces 2a, 2a are serially arranged on only one yoke 1a so as to leave a gap 7 therebetween.

The number of magnet pieces on each yoke is one or two as mentioned above. In the case of one magnet piece, it is magnetized so as to produce alternate magnetic poles in a planar direction. In the case of two magnet pieces, each piece is magnetized in a thickness direction to produce N and S poles on their surface, and two pieces are arranged in series so that N and S poles alternate in a plan view. The arrangement of two magnet pieces may be adjusted such that the distance between the magnet pieces may range from zero to a suitable value, depending on the deflection range or amplitude of the moving coil.

For attachment of magnets, heat resistant adhesives such as epoxy resins or acrylic resins are preferably used. In view of the heat release within the hard-disk unit, the magnet may be attached to the yoke by the attractive force of the magnet without resorting to the adhesive.

The magnet used herein may have a rectangular prism or parallelepiped prism shape as mentioned above, with the rectangular prism shape being preferred from the working aspect. Ordinary magnets used in the industry include sintered magnets prepared from magnetizable raw materials by melting, grinding, molding and sintering, and bonded magnets prepared by melting, grinding, and resin-aided molding. This is also true in the invention. When a rectangular mold is used in the molding step, the molded part may be easily machined to the desired hexahedral structure. Then the yield of magnet working is improved. Magnets may be worked into a rectangular shape using a peripheral milling edge or wire saw.

As described above, either sintered magnets or bonded magnets may be used in the practice of the invention. They may be ferrite, alnico or rare earth magnets. In the case of rare earth magnets which are susceptible to oxidation, a plating of metal such as Ni or Cu or a coating of antioxidant is recommended.

In the embodiments of FIGS. 4 to 6 wherein magnets are disposed on two yokes, respectively, the magnetic circuits each consisting of a yoke and a magnet attached thereto are assembled so that the magnets face each other while they are spaced apart by magnetic material posts, and an arm having a moving coil wound thereon is inserted into the space defined between the magnetic circuits, constructing a VCM. In the embodiments of FIGS. 7 to 9 wherein a magnet is disposed on one yoke, but not on the other yoke, the components are assembled so that the magnet faces the other yoke, and an arm having a moving coil wound thereon is inserted into the space defined between the magnet and the other yoke, constructing a VCM. The magnetic circuits to be opposed should have the same properties. The resulting VCM operates in accordance with Fleming's rule to drive the moving coil for imparting thrust to the actuator.

EXAMPLE

Examples of the invention are given below by way of illustration and not by way of limitation.

Example 1

A Nd—Fe—B sintered magnetizable block (N48M by Shin-Etsu Chemical Co., Ltd.) was machined into a rectangular prism of 40.4 mm×12.4 mm×6 mm. It was adhesively attached to a yoke of carbon steel having a thickness of 5 mm and then magnetized to produce N and S poles by means of a magnetizer, constructing a magnetic circuit. The magnet could be attached to the yoke at its center, ensuring ease of registration.

Two yokes were fixedly coupled by posts of the same magnetic material as the yokes to define a space of 10 mm between the magnets. An arm having a moving coil of copper wire wound thereon was inserted into the space, constructing a VCM as shown in FIGS. 4A and 4B. The torque of VCM was measured with the results shown in FIG. 11.

Example 2

A Nd—Fe—B sintered magnetizable block (N48M by Shin-Etsu Chemical Co., Ltd.) was machined into rectangular prisms of 20.2 mm×12.4 mm×6 mm. Two pieces were arranged in a straight serial contiguous array and adhesively attached to a yoke of carbon steel having a thickness of 5 mm. They were magnetized in a thickness direction by means of a magnetizer so that N and S poles of serially arranged magnet pieces alternated along the yoke, completing a VCM as shown in FIGS. 5A and 5B. The assembly process was otherwise the same as in Example 1. The torque of VCM was measured with the results shown in FIG. 11.

Comparative Example 1

A magnetic circuit was constructed as in Example 1 except that a magnetizable block was machined into an arcuate piece of R29×R16×6 mm×60° (see FIG. 3). A VCM as shown in FIG. 3 was constructed and measured for torque, with the results shown in FIG. 11.

Figure 10:
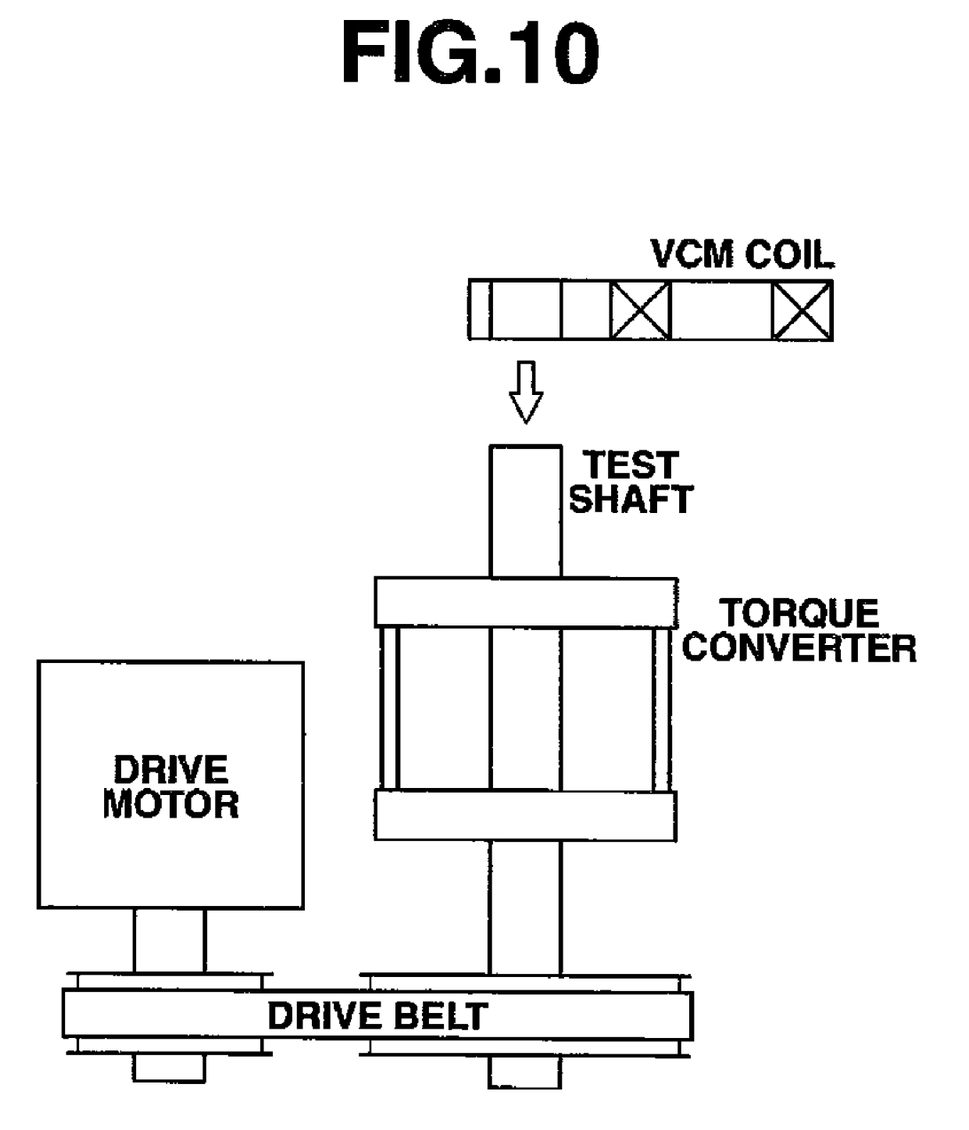
FIG. 10 schematically illustrates a coil torque measuring system.

In the foregoing Examples and Comparative Example, the torque of VCM was measured by the following method. FIG. 10 illustrates a coil torque measuring system which includes a drive motor, a test shaft, a drive belt for operatively connecting the drive motor and the shaft, and a torque converter associated with the shaft. A VCM coil is mounted on the test shaft. The drive motor is operated to rotate the VCM coil while the torque is measured by the torque converter. The results are plotted in FIG. 11.

Figure 11:
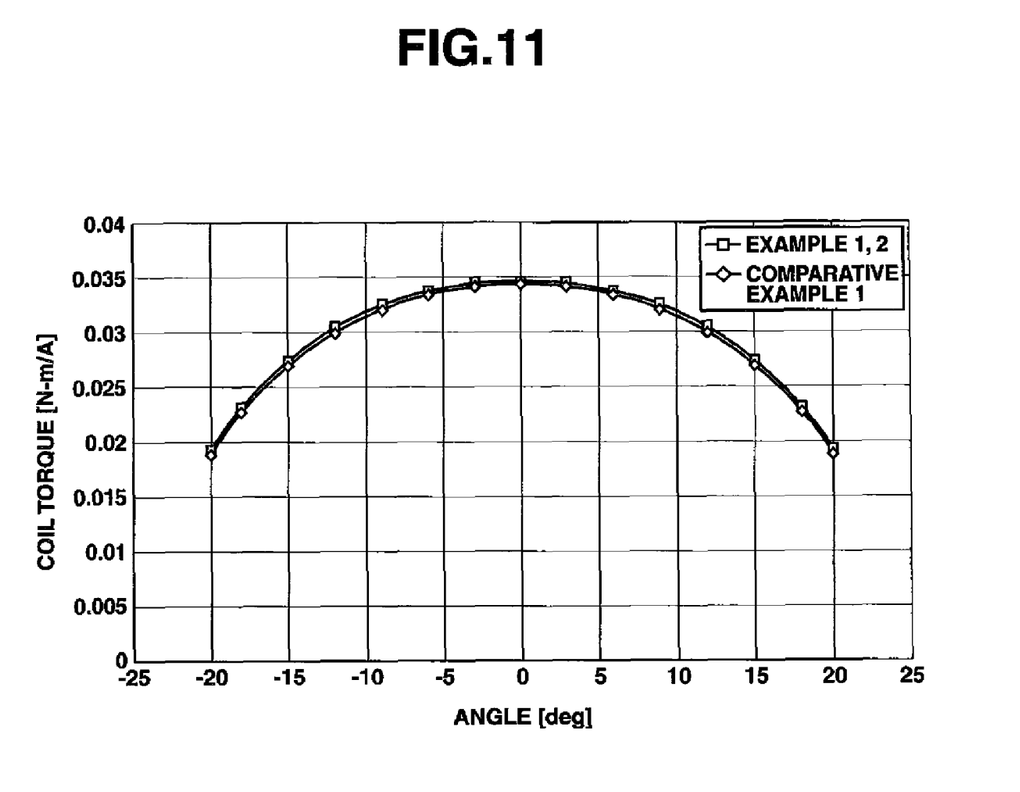
FIG. 11 is a graph showing the coil torque of VCM as a function of angle.

As seen from FIG. 11, a necessary torque is available when prism-shaped magnet pieces which can be efficiently produced at a relatively low cost are used.

Japanese Patent Application No. 2007-072789 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A magnetic circuit for a voice coil motor, comprising a magnetic material yoke and magnet means disposed thereon, wherein
the magnetic material yoke is configured to a triangular shape, a frusto-triangular shape in which the apex of a triangle is truncated or round, or an arcuate, crescent or semi-circular ring shape in which the bottom of a triangle at its center is recessed or cut-off in a semi-circular, triangle or apex-rounded triangular form,
the magnet means on said yoke consists of a single magnet piece of rectangular prism or parallelepiped prism shape, and
the single magnet piece is disposed on said yoke such that the longitudinal direction of said single magnet piece is parallel to a bottom of said yoke or a straight line connecting the lower ends of two oblique sides of said yoke.

2. A magnetic circuit for a voice coil motor, comprising:

a pair of opposed magnetic material yokes; and magnet means disposed on at least one of the pair of yokes so that the magnet means faces the other yoke, wherein the magnetic material yoke is configured to a triangular shape, a frusto-triangular shape in which the apex of a triangle is truncated or round, or an arcuate, crescent or semi-circular ring shape in which the bottom of a triangle at its center is recessed or cut-off in a semi circular, triangle or apex-rounded triangular form, the magnet means disposed on a said yoke consists of a single magnet piece of rectangular prism or parallelepiped prism shape, and the single magnet piece is disposed on yoke such that the longitudinal direction of said magnet piece is parallel to a bottom of said yoke or a straight line connecting the lower ends of two oblique sides of said yoke.

3. The magnetic circuit of claim 2, wherein the magnet means is disposed on each of the pair of yokes so that the magnet means face each other, each said magnet means disposed on a respective yoke consists of a single magnet piece of rectangular prism or parallelepiped prism shape, and each single magnet piece is disposed on said yoke such that the longitudinal direction of said magnet piece is parallel to a bottom of said yoke or a straight line connecting the lower ends of two oblique sides of said yoke.

4. A voice coil motor comprising:

a magnetic circuit comprising a pair of opposed magnetic material yokes, and magnet means disposed on at least one of the pair of yokes so that the magnet means faces the other yoke, wherein the magnetic material yoke is configured to a triangular shape, a frusto-triangular shape in which the apex of a triangle is truncated or round, or an arcuate crescent or semi-circular ring shape in which the bottom of a triangle at its center is recessed or cut-off in a semi circular, triangle or apex-rounded triangular form, the magnet means disposed on a said yoke consists of a single magnet piece of rectangular prism or parallelepiped prism shape, and the single magnet piece is disposed on yoke such that the longitudinal direction of said magnet piece is parallel to bottom of said yoke or a straight line connecting the lower ends of two oblique sides of said yoke; and a moving coil located between the magnet piece and the other yoke.

5. The voice coil motor of claim 4, wherein the magnet means are disposed on each of the pair of yokes so that the magnet means face each other each said magnet means disposed on a respective yoke consists of a single magnet piece of rectangular prism or parallelepiped prism shape, and each single magnet piece is disposed on said yoke such that the longitudinal direction of said magnet piece is parallel to a bottom of said yoke or a straight line connecting the lower ends of two oblique sides of said yoke.

* * * * *